United States Patent [19]
Park et al.

[11] Patent Number: 5,879,645
[45] Date of Patent: Mar. 9, 1999

[54] METHOD FOR REMOVING NITROGEN OXIDES IN EXHAUST GAS BY SELECTIVE CATALYTIC REDUCTION AND CATALYST FOR REDUCTION OF NITROGEN OXIDES

[75] Inventors: Sang-Eon Park, Daejeon; Gyung-Mi Kim, Taegu; Yun-Jo Lee, Seoul; Jong-San Chang, Daejeon; Seong-Hee Han, Seoul, all of Rep. of Korea

[73] Assignee: Korea Research Institute of Chemical Technology, Rep. of Korea

[21] Appl. No.: 553,028

[22] Filed: Nov. 3, 1995

[30]     Foreign Application Priority Data

Nov. 3, 1994 [KR] Rep. of Korea .................. 1994-29033

[51] Int. Cl.$^6$ ............................ B01J 23/02; B01J 23/10; B01J 29/06; C01B 21/20
[52] U.S. Cl. ................................... 423/213.2; 423/213.5; 423/239.1; 423/239.2; 502/65; 502/263; 502/302; 502/303; 502/304
[58] Field of Search ..................................... 502/304, 303, 502/305, 306, 307, 308, 309, 311, 312, 313, 314, 315, 316, 317, 318, 325, 326, 327, 328, 302, 65; 423/239.1, 239.2, 213.2, 213.5

[56]              References Cited

U.S. PATENT DOCUMENTS

| | | | |
|---|---|---|---|
| 5,208,202 | 5/1993 | Maramatsu et al. | ..................... 502/302 |
| 5,712,217 | 1/1998 | Choudhary et al. | ..................... 502/303 |

FOREIGN PATENT DOCUMENTS

| | | |
|---|---|---|
| 3-101837 | 4/1991 | Japan . |
| 3-86213 | 4/1991 | Japan . |
| 5-38435 | 2/1993 | Japan . |
| 5-212288 | 8/1993 | Japan . |

OTHER PUBLICATIONS

Iwamoto, et al., Shokubai 32, pp. 430–433 Abstract (1990) [66 CATSJ Meetings Abstracts No. 20404].
Hamada et al., *Applied Catalysis*, 64, pp. L1–L4 (1990).
Li et al., *Applied Catalysis*B. Environmental, 1 (1992) pp. L31–L40.
Held et al., "Catalytic NOx Reduction in Net Oxidizing Exhaust Gas," SAE Technical Paper Series 900496, International Congress and Exposition, Feb. 26–Mar. 02, 1990.
Chikafumi et al., Shokubai 35, pp. 122–125 (1993) Abstract [71st CATSJ Meeting Abstracts No. 1B6].
Shin et al., *Mat. Res. Bull.*, vol. 14, pp. 133–136 (1979).
Shimada et al., *Chemistry Letters*, pp. 1797–1800 (1988).
Teraoka et al., *Chemistry Letters*, pp. 1–4 (1990).
Iwamoto et al., *Catalysis Today*, 10 (1991), pp. 57–71.

*Primary Examiner*—Wayne Langel
*Attorney, Agent, or Firm*—Vorys Sater Seymour & Pease LLP

[57]              ABSTRACT

The present invention provides a catalyst for reduction of nitrogen oxides represented by the formula $(A_aO_x \cdot B_bO_y) \cdot (C_cO_z \cdot C'_{c'}O_{z'})/S$ which is produced by supporting mixed metal oxides represented by the formula $(A_zO_x \cdot B_bO_y) \cdot (C_cO_z \cdot C'_{c'}O_{z'})$ in amorphous state on aluminum or silicon-containing support at calcination temperature of 400° to 700° C. in a molar ratio of 0.01:1 to 5:1, and a method for removing nitrogen oxides through selective catalytic reduction which comprises converting 50 to 50,000 ppm of nitrogen oxides in exhaust gas from automobile or from fixed source such as plant turbine and boiler, and other industry in a state of having 0.1 to 20% of excessive oxygen over $(A_aO_x \cdot B_bO_y) \cdot (C_cO_z \cdot C'_{c'}O_{z'})/S$ catalyst by using 100 to 100,000 ppm of hydrocarbon reducing agent having 1 to 5 carbons under the reaction condition of 200° to 800° C. of reaction temperature, 1 to 10 atmosphere of reaction pressure and 1000 to 100,000/hour of space velocity into nitrogen in which A and B are lanthanide metals, such as lanthanum, cerium, praseodymium or neodymium, and alkali metals or alkaline earth metals, such as sodium, potassium, rubidium, cesium, magnesium, calcium, strontium or barium, C and C' are transition metals of the first period, such as cobalt, copper, nickel, manganese, iron, vanadium, titanium, chromium and zinc, and noble metals, such as platinum, rhodium, iridium, ruthenium, rhenium, palladium and silver, a, b, c and c' have stoichiometrically 0 to 1, provided with a+b=1, c+c'=1 and is in the range of 0.1–3.0:1.0, and S is aluminum or silicon-containing support, and is zeolite, silica, alumina or silica-alumina.

15 Claims, No Drawings

METHOD FOR REMOVING NITROGEN OXIDES IN EXHAUST GAS BY SELECTIVE CATALYTIC REDUCTION AND CATALYST FOR REDUCTION OF NITROGEN OXIDES

FIELD OF THE INVENTION

The present invention relates to a catalyst for reduction of nitrogen oxides and to a method for removing or reducing nitrogen oxides in exhaust gas by selective catalytic reduction. More specifically, the present invention relates to a method for removing nitrogen oxides in exhaust gas from mobile source such as automobile and fixed source such as plant and boiler under a condition of excessive oxygen by selectively reducing and converting them into nitrogen and oxygen.

BACKGROUND OF THE INVENTION

Nitrogen oxides ($NO_x$) meaning nitrogen monoxide, nitrogen dioxide and nitrous oxide are environmental contaminant materials like carbon oxides and sulfur oxides. Nitrous oxide is not very toxic, but it is one of major contaminants causing global warming like carbon dioxide. Nitrogen monoxide is a major component of nitrogen oxides in exhaust gas, and can be easily converted into nitrogen dioxide even at room temperature when it is discharged into air. Both nitrogen monoxide and nitrogen dioxide are carcinogenic materials. They cause serious air pollution and acid rain like sulfur oxides. The discharge of nitrogen oxides are caused mostly by reaction of nitrogen and oxygen in air during high temperature combustion and combustion of nitrogen compound contained in fuel. There is, therefore, a need to provide a technique of removing nitrogen oxides by treating exhaust gas in addition to controlling the generation of nitrogen oxides through combustion control.

The technique of removing nitrogen oxides is largely divided into two groups depending on their use of catalyst. When a catalyst is used, the technique is divided into a method using reducing agent and a method of decomposing directly on a catalyst without using reducing agent. A method which directly decompose nitrogen oxides in exhaust gas on catalyst into nitrogen and oxygen is referred since nitrogen oxides are unstable thermodynamically as compared to nitrogen and oxygen. However, a suitable catalyst for the method is not found since the method has problems in that it requires high reaction temperature and the activity of the catalyst decreases easily.

The technique of selective catalytic reduction of nitrogen oxides has come to employed since the treatment with ammonia as a reducing agent was practically used and the application of the technique has rapidly increased. Taking into account the fact that the discharge of various environmental contaminating exhaust gas will be severely regulated in advanced nations, it is likely hay the demand of the technique will increase largely. However, the conventional reduction method using ammonia as a selective reducing agent has some problems in that in addition to the problems of difficulty of transport and charge and high equipment maintenance cost due to the corrosion property of ammonia, unreacted ammonia is drawn off into the air and thus cause secondary air pollution. Owing to those drawbacks, recently the research has been devoted to substitution of carbon containing compounds, such as hydrocarbon, methanol or ethanol for a reducing agent.

In order to develop reduction catalysts which directly decompose nitrogen monoxide or in available for selective contact reducing agent, many researches have been investigated concerning metal or metal oxide catalyst of platinum group since 1970. When air to fuel ratio of automobile is stoichiometric, three-way catalyst of platinum-palladium-rhodium is able to convert carbon monoxide, hydrocarbon and nitrogen oxides which are contaminants of exhaust gas to innoxious gas by more than 90%. However, in the case that exhaust gas is dilute under excessive oxygen as in lean burn gasoline engine or diesel engine, the three-way catalyst can not act as reduction catalyst for nitrogen oxides but only as oxidation catalyst. For this reason, copper ion exchanged Cu—ZSM-5 zeolite and various metal oxides catalyst have been developed as catalysts for removing nitrogen oxides for substituting for three-way catalyst of platinum group. According to the reports made until now, copper ion exchanged Cu—ZSM-5 zeolite are said to be the most effective catalyst for converting nitrogen oxides into nitrogen and oxygen.

Japanese Patent No. 03 86 213 according to Hamada et al., suggested the use of various zeolites including modernite, ferrierite, L type and ZSM-5 as catalysts for converting nitrogen oxides into innoxious gas under excessive oxygen. The catalyst shows very high activity on direct decomposition of nitrogen oxides. Iwamoto et al. suggested Cu—ZSM-5 zeolite which is exchanged by copper ion by more than 100% in over pH 6 in Japanese Patent 03 101 837 had excellent effect on converting nitrogen oxides. Many studies have confirmed the possibility of using Cu—ZSM-5 zeolite as direct decomposition catalyst for nitrogen oxides. However, it is sensitive to sulfur oxides and steam, and thus easily lose activity. The activity can be reduced considerably under excessive oxygen and at high space velocity as well. To solve such problems relating to Cu—ZSM-5 zeolite, Iwamoto and Hamada (Shokubai, 32 430 (1990), Appl. Catal., 64, L1 (1990)), and Held et al., (SAE Paper 900496 (1990)) proposed selective catalytic reduction of nitrogen oxides by utilizing hydrocarbon contained in exhaust gas.

Zeolite catalyst systems exchanged by transition metal ion other than copper ion are Co—ZSM-5 disclosed in Appl. Catal. B. 1, L31 (1992) according to Arm et al. (USA) and Ga—ZSM-5 in Japanese Patent 05 212 288. These catalysts showed very high reduction activity of nitrogen oxides due to oxidation of hydrocarbon even in the presence of excessive oxygen in 10% or so and in methane which is nonselective reducing agent. Yokoyama et al. also suggested several kinds of catalyst systems including Ce—ZSM-5 overcome the drawbacks of Cu—ZSM-5 catalyst (Shokubai, 35, 122 (1993).

As a compound having direct decomposition activity of nitrogen oxides, there are supported noble metal catalyst (typically, platinum/alumina), transition metal oxides (typically, cobalt oxides $CO_3O_4$), mixed metal oxides (typically, perovskite oxides) and transition metal-exchanged ZSM-5 zeolites (typically, Cu—ZSM-5). Among them, metal oxides or complex thereof are known to have high decomposition activity of nitrogen oxides at high temperature, but to have drastically decreased decomposition activity of $NO_x$ in the presence of excessive oxygen. There are little reports on selective catalytic reduction of mixed metal oxides using hydrocarbon as a reducing agent in the presence of excessive oxygen. Shin et al. reported decomposition activity of $SrFeO_{3-x}$ having perovskite structure with regard to nitrogen oxides in Mat. Res. Bull., 14, 133 (1979). Teraoka et al. reported decomposition activity of lanthanum-strontium-cobalt (manganese, iron, copper) with regard to $NO_x$ showed 30 to 75% of $NO_x$ conversion at high temperature of 700° to 800° C. (Chem. Lett., 1 (1990)). Shimada et al. reported that itrium-barium-copper oxide and itrium-barium-copper/magnesia showed 73% of decomposition activity at a temperature of over 600° C. (Chem. Lett., 1 (1988)). However, Iwamoto and Hamada et al. also found that the activity of $SrFeO_{3-x}$ oxide, lanthanum-cobalt oxide and itrium-barium-copper oxide was reduced drastically in the presence of 5% oxygen, which resulted from low surface area of the those oxides (Catal. Today, 10, 57 (1991)). Examples of utilizing mixed oxide of perovskite type for the treatment of nitrogen oxides were disclosed in Japanese Patent 05 38 435. In this patent, as catalysts for removing air pollutants containing hydrocarbon, carbon monoxide and nitrogen oxides, mixed oxides including rare earth elements and oxides thereof, alumina, zirconia, iron oxides, bismuth oxides, complex perovskite containing more than one of noble metal were suggested, which were known to have heat resistance and catalyst stability.

Mixed metal oxides with perovskite structure have some drawbacks, for example, they show the decomposition activity for $NO_x$ only at high temperature, and their activity is drastically reduced in the presence of oxygen.

Therefore, the present inventors have made extensive studies to solve the problems relating to the mixed metal oxides with perovskite structure. As a result the present inventors have now found that the mixed metal oxides/zeolite catalyst produced by supporting mixed metal oxides on ZSM-5 zeolite support can be used in selective catalytic reduction of $NO_x$ using hydrocarbon as a reducing agent in oxygen excess and thus the activity of selective catalytic reduction of that catalyst can be maximized at low temperature less than 400° C.

SUMMARY OF THE INVENTION

One object of the present invention is to provide a catalyst for $NO_x$ reduction represented by the formula $(A_aO_x.B_bO_y).(C_cO_z.C'_{c'}O_{z'})/S$.

Another object of the invention is to provide a method for removing or reducing $NO_x$ in exhaust gas which comprises selective reduction of $NO_x$ in oxygen excess.

Other objects and advantages will be apparent to those who have ordinary skill in the art from the following description.

DETAILED DESCRIPTION OF THE INVENTION

The present invention relates to a catalyst for $NO_x$ reduction and to a method for removing or reducing $NO_x$ in exhaust gas by selective catalytic reduction.

The present invention provides a catalyst for $NO_x$ reduction to be used in selective catalytic reduction of $NO_x$ represented by the formula $(A_aO_x.B_bO_y).(C_cO_z.C'_{c'}O_{z'})/S$ wherein A and B are lanthanide metals, such as lanthanum, cerium, praseodymium or neodymium, and alkali metals or alkaline earth metals, such as sodium., potassium, rubidium, cesium, magnesium, calcium, strontium or barium, C and C' are transition metals of the first period, such as cobalt, copper, nickel, manganese, iron, vanadium, titanium, chromium and zinc, and noble metals, such as platinum, rhodium, iridium, ruthenium, rhenium, palladium and silver, a, b, c and c' have stiochiometrically 0 to 1, provided that a+b=1, c+c'=1; is in the range of 0.1–3.0:1.0, and the mole ratio of the metal oxide precursors to the support material is in the range of 0.01:1 to 5:1.

The present invention also provides a method for removing $NO_x$ through selective catalytic reduction which comprises converting 50 to 50,000 ppm of $NO_x$ in exhaust gas from automobile or from fixed source such as plant turbine and boiler, and other industry in a state of having 0.1 to 20% of excessive oxygen over $(A_aO_x.B_bO_y).(C_cO_z.C'_{c'}O_{z'})/S$ catalyst by using 100 to 100,000 ppm of hydrocarbon reducing agent having 1 to 5 carbon atoms under the reaction condition of 200° to 800° C. of reaction temperature, 1 to 10 atmosphere of reaction pressure and 1000 to 100,000/hour of space velocity into nitrogen and oxygen.

The reducing agent used in the present invention include olefins and paraffins of 1 to 5 carbon atoms.

The components and composition of mixed metal oxides in mixed metal oxides/zeolite catalyst system suggested in the present invention are similar to those of perovskite type, but the catalyst system of the present invention shows high selective catalytic reduction activity upon $NO_x$ at low temperature unlike perovskite oxide. In the present invention, amorphous type wherein mixed metal oxides are dispersed in zeolite support acts as active catalyst, and once perovskite phase in crystalline state is formed on support, the catalytic activity is largely reduced and the reaction behavior also changed. Accordingly, in the present invention the condition of supporting mixed metal oxides is controlled not to form crystalline perovskite type on zeolite support, considering the method for producing catalyst and calcination temperature. The characteristics of the present invention are that mixed metal oxides having direct decomposition activity of $NO_x$ at high temperature can be converted into catalyst having high selective catalytic reduction activity at low temperature, and such an activity results from mixed metal oxides supported in an amorphous state on support and their interaction with support. The present inventors have also found that the addition of rare earth element and/or alkaline earth metal to active transition metal can increase the activity and lower the maximum active temperature.

Therefore, the present method has very significant meaning as environmental technology capable of effectively removing $NO_x$ since it can convert $NO_x$ which are in exhaust gas from automobile and stationary source are very harmful to human body and main contaminants of acid rain and aid pollution into innoxious nitrogen by using the catalyst according to the present invention.

Now the present invention will be described more specifically with reference to examples hereafter, however it should be noted that the present invention is not intended to be restricted within those specific examples.

EXAMPLE 1

In this example, cobalt-lanthanum oxide ($CoO_x$—$La_2O_3$) /HZSM-5 zeolite catalyst ("Catalyst 1") was prepared by supporting precursor of mixed metal oxide of cobalt-lanthanum on zeolite support by sol-gel method. Nitrates of lanthanum and cobalt were dissolved in distilled water in a molar ratio of 1:1 at room temperature, and citric acid in an amount of equivalent number of mole of metal was added to that of nitrate of metal and dissolved, and then ethylene glycol in an amount of equivalent mole number was added. To this mixed solution was added HZSM-5 (silica:alumina= 40:1) as a support in a ratio of 25% by weight of mixed metal oxide and mixed. The mixture was concentrated under reduced pressure and dried at 80° to 150° C. for 12 hours to give precursor of mixed metal oxides supported on zeolite. Finally, the precursor was subjected to heat treatment at 300° C. for 5 hours and 500° C. for 5 hours in air continuously in order to make mixed metal oxides sufficiently interact with zeolite support without forming crystalline perovskite phase in the calcination step, and then at last calcimined at 550° C. for 5 hours to give the catalyst 1. The X-ray diffraction analysis of the produced catalyst showed that no phase relating metal component added was observed and the catalyst is mostly amorphous state regardless of the addition of 25 wt. % metal oxides component The "catalyst 1" prepared above was subjected to selective catalytic reduction by charging it into fixed-bed reactor made from quartz tube having inner diameter of 10 mm and pretreated at 500° C. under the stream of helium for 1 hour and then determined the activity of selective catalytic reduction of NO by hydrocarbon at space velocity of 10,000/hour. The reaction gas consist of 1000 ppm of NO, 1000 ppm propylene and 3 vol. % of oxygen and the remaining is helium which is used as diluent gas. Nitrogen produced by selective catalytic reduction was measured by gas chromatography (manufactured by Chrompak, Model CP 9001) and decrease of NO was analyzed by $NO_x$ analyzer (manufactured by DAI systems, Model 6000). The result summarized in Table 1 showed that the conversion of nitrogen monoxide was maximized to 91.5% at low temperature of 240° C.

COMPARATIVE EXAMPLE 1

In the comparative example, the activity of selective catalytic reduction was measured under the same method and condition as in Example 1 by using copper ion exchanged Cu—ZSM-5 zeolite ("Catalyst 2"). "Catalyst 2" was prepared by following method: 10 g of HZSM-5 (silica: alumina=40:1) was dissolved in 1 liter of aqueous solution of copper nitrate (0.05 Normality) as a copper source and mixed at 70° C. for overnight. After filtration and drying, the above procedure was repeated twice and then calcined at 500° C. As shown in Table 1, conversion of nitrogen monoxide was maximized (91.3%) at 420° C., which was very similar to that of Example 1 and maximum active temperature was shifted to high temperature more than 400° C.

COMPARATIVE EXAMPLE 2

The activity of selective catalytic reduction was measured in general accordance with method and condition of Example 1 by using cobalt-lanthanum oxide ("Catalyst 3") which is not supported on zeolite. The catalyst 3 was prepared by the same method of Example 1 except that support was not used. The result showed that the conversion of nitrogen monoxide was maximized (14.7%) at a reaction temperature of 530° C., which was much lower activity compared to that of catalyst 1.

COMPARATIVE EXAMPLE 3

This comparative example means to examine the effect of support on the catalyst of Example 1 by carrying out selective catalytic reduction in general accordance with the method and condition of Example 1 by using HZSM-5 zeolite only in Example 1 ("Catalyst 4"). The result showed that the conversion of nitrogen monoxide was maximized (20.1%) at a reaction temperature of 550° C., which is much lower activity compared to that of catalyst of Example 1. The comparison confirmed that cobalt-lanthanum oxide showed remarkable increase in activity and decreasing effect of maximum active temperature when it was supported on zeolite support.

COMPARATIVE EXAMPLE 4

The activity of selective catalytic reduction was measured in general accordance with the method of Example 1 by using cobalt oxide/ZSM-5 zeolite catalyst ("Catalyst 5") prepared by the method of Example 1 except that lanthanum was excluded. The result showed that the conversion of nitrogen monoxide was maximized (57.2%) at a reaction temperature of 380° C., which was much lower activity compared to that of the catalyst of Example 1. The result confirmed that the addition of lanthanum component in the production of the catalyst of Example 1 contributed to increase the activity of the catalyst.

EXAMPLE 2

The activity of selective catalytic reduction was measured by using catalysts prepared in general accordance with the method of Example 1 with changing the amount of mixed metal oxides in catalyst to 6, 12, 18 and 25% by weight under the same condition as in Example 1 except that the space velocity increased to 30,000/hour. Maximum active temperature and maximum conversion of nitrogen monoxide were summarized in Table 2. When the amount of metal oxides is as low as 6% or less, maximum activity was obtained at as high as 480° C., while two kinds of maximum activity was obtained at around 300° C. and 400° C. when the amount of metal oxide is more than 12%.

EXAMPLE 3

The selective catalytic reduction activity was measured in general accordance with the method of Example 1 by using catalyst 1 prepared in Example 1 under the same condition as in Example 1 except that space velocity increased to 30,000/hour. Maximum active temperature and maximum conversion of nitrogen monoxide were summarized in Table 3. The result showed that the conversion of nitrogen monoxide was maximized (86.8%) at a reaction temperature of 240° C.

COMPARATIVE EXAMPLE 5

In this comparative example, catalyst having the same component and composition as in Example 1 was prepared in general accordance with the method in Example 1 and then calcined at 800° C. The X-ray diffraction analysis of the obtained catalyst confirmed that mixed metal oxides supported on zeolite support had crystalline perovskite phase. The activity of selective catalytic reduction of the catalyst was measured under the same condition as in Example 3. The result showed that the conversion of nitrogen monoxide was maximized (41.2%) at a reaction temperature of 500° C. The result confirmed that the activity of the catalyst in which crystalline perovskite phase had been formed due to calcining at high temperature remarkably decreased as compared to that of the catalyst in which amorphous mixed metal oxide was supported on support. The range of maximum active temperature also shifted to high temperature region.

EXAMPLE 4

The activity of selective catalytic reduction was measured under the same condition as in Example 3 by using the catalyst prepared in general accordance with the method of Example 1 except that nickel was used as active metal component in place of cobalt. The maximum active temperature and the maximum conversion of nitrogen monoxide were measured and summarized in Table 3. The conversion of nitrogen monoxide was maximized (78.0%) at a reaction temperature of 340° C.

EXAMPLE 5

The activity of selective catalytic reduction was measured under the same condition as in Example 3 by using the catalyst prepared in general accordance with the method of Example 1 except that manganese was used as active metal component in place of cobalt. The maximum active temperature and the maximum conversion of nitrogen monoxide were measured and summarized in Table 3. The conversion of nitrogen monoxide was maximized (74.2%) at a reaction temperature of 310° C.

EXAMPLE 6

The activity of selective catalytic reduction was measured under the same condition as in Example 3 by using the catalyst prepared in general accordance with the method of Example 1 except that copper was used as active metal component in place of cobalt. The maximum active temperature and the maximum conversion of nitrogen monoxide were measured and summarized in Table 3. The conversion of nitrogen monoxide was maximized (92.6%) at a reaction temperature of 440° C.

EXAMPLE 7

The activity of selective catalytic reduction was measured under the same condition as in Example 3 by using the catalyst prepared in general accordance with the method of Example 1 except that mixture of cobalt and platinum in a molar ratio of 0.8:0.2 was used as active metal component in place of cobalt. The maximum active temperature and the maximum conversion of nitrogen monoxide were measured and summarized in Table 3. The conversion of nitrogen monoxide was maximized (73.8%) at a reaction temperature of 310° C.

EXAMPLE 8

The activity of selective catalytic reduction was measured under the same condition as in Example 3 by using the catalyst prepared in general accordance with the method of Example 1 except that mixture of cobalt and palladium in a molar ratio of 0.8:0.2 was used as active metal component. The maximum active temperature and the maximum conversion of nitrogen monoxide were measured and summarized in Table 3. The conversion of nitrogen monoxide was maximized (68.5%) at a reaction temperature of 320° C.

TABLE 1

| Example/Comp. Ex. | Catalyst | Maximum Active Temperature (°C.) | Maximum conversion of NO (%) |
| --- | --- | --- | --- |
| Ex. 1 | Catalyst 1 | 240 | 91.5 |
| Com.Ex. 1 | Catalyst 2 | 520 | 61.2 |
| Com.Ex. 2 | Catalyst 3 | 530 | 14.7 |
| Com.Ex. 3 | Catalyst 4 | 550 | 20.1 |
| Com.Ex. 4 | Catalyst 5 | 380 | 57.2 |

TABLE 2

| Metal Oxide Content | Maximum Active Temperature (°C.) | Maximum conversion of NO (%) |
| --- | --- | --- |
| 6 | 480 | 83.7 |
| 12 | 250 | 73.2 |
|  | 410 | 65.3 |
| 18 | 250 | 84.2 |
|  | 410 | 53.0 |
| 25 | 240 | 86.8 |
|  | 410 | 42.1 |

TABLE 3

| Example | Sort of Active Metal | Maximum Active Temperature (°C.) | Maximum conversion of NO (%) |
| --- | --- | --- | --- |
| Ex. 3 | Cobalt | 240 | 86.0 |
| Com.Ex. 5 | Cobalt | 500 | 41.2 |
| Ex. 4 | Nickel | 340 | 78.0 |
| Ex. 5 | Manganese | 310 | 74.2 |
| Ex. 6 | Copper | 440 | 92.6 |
| Ex. 7 | Cobalt/Platinum | 310 | 74.2 |
| Ex. 8 | Cobalt/Palladium | 440 | 92.6 |

What is claimed is:

1. A catalyst for reduction of nitrogen oxides represented by the formula $P(A_aO_x.B_bO_y).Q(C_cO_z.C'_{c'}O_{z'})/S$ comprising mixed metal oxides represented by the formula $P(A_aO_x.B_bO_y).Q(C_cO_z.C'_{c'}O_{z'})$ in an amorphous state supported on a zeolite wherein A and B are different metals selected from the group consisting of lanthanide metals, alkali metals and alkaline earth metals, with the proviso that at least one of A and B is a lanthanide metal, and when A is a lanthanide metal, a is not zero and when B is a lanthanide metal, b is not zero, C and C' are metals selected from the group consisting of transition metals of the first transition period of the periodic table, silver, platinum, rhodium, iridium, ruthenium, rhenium, and palladium, a, b, c and c' are numbers ranging from 0 to 1, provided that a+b=1, c+c'=1, x, y, z and z' are numbers chosen to satisfy the valence requirements of A, B, C and C', P and Q are numbers chosen so that the ratio P:Q is 1:1, and S is a zeolite support;

wherein said catalyst is produced by supporting said mixed metal oxides represented by the formula $P(A_aO_x.B_bO_y).Q(C_cO_z.C'_{c'}O_{z'})$ in an amorphous state on a zeolite by calcining precursors of said metal oxides mixed with said zeolite support material in a mole ratio of said precursors to said support material of 0.01:1 to 5:1 at a temperature of 400° C. to 700° C.

2. The catalyst of claim 1 wherein said lanthanide metals are selected from the group consisting of lanthanum, cerium, praseodymium and neodymium.

3. The catalyst of claim 1 wherein said alkali metals and said alkaline earth metals are selected from the group consisting of sodium, potassium, rubidium, cesium, magnesium, calcium, strontium and barium.

4. The catalyst of claim 1 wherein said alkali metals and said alkaline earth metals are selected from the group consisting of cobalt, copper, nickel, manganese, iron, vanadium, titanium, chromium and zinc.

5. A method for removing nitrogen oxides from exhaust gases of combustion containing 0.1% to 20% excess oxygen by selective catalytic reduction which comprises contacting said exhaust gas over a catalyst comprising $P(A_aO_x.B_bO_y).Q(C_cO_z.C'_{c'}O_{z'})/S$ in the presence of 100 to 100,000 ppm of a reducing agent comprising a hydrocarbon having 1 to 5 carbon atoms at a temperature of 200° to 800° C., a pressure of 1 to 10 atmospheres, a space velocity of 1000 to 100,000/hour, wherein A and B are different metals selected from the group consisting of lanthanide metals, alkali metals and alkaline earth metals, with the proviso that at least one of A and B is a lanthanide metal, and when A is a lanthanide metal, a is not zero and when B is a lanthanide metal, b is not zero, C and C' are metals selected from the group consisting of transition metals of the first transition period of the periodic table, silver, platinum, rhodium, iridium, ruthenium, rhenium, and palladium, a, b, c and c' are numbers ranging from 0 to 1, provided that a+b=1, c+c'=1, x, y, z and z' are numbers chosen to satisfy the valence requirements of A, B, C and C', P and Q are numbers chosen so that the ratio P:Q is 1:1, and S is a zeolite support;

wherein said catalyst is produced by supporting said mixed metal oxides represented by the formula $P(A_aO_x.B_bO_y).Q(C_cO_z.C'_{c'}O_{z'})$ in an amorphous state on a zeolite by calcining precursors of said metal oxides mixed with said zeolite support material in a mole ratio of said precursors to said support material of 0.01:1 to 5:1 at a temperature of 400° C. to 700° C.

6. The method of claim 5 wherein said lanthanide metals are selected from the group consisting of lanthanum, cerium, praseodymium and neodymium.

7. The method of claim 5 wherein said alkali metals and said alkaline earth metals are selected from the group consisting of sodium, potassium, rubidium, cesium, magnesium, calcium, strontium and barium.

8. The method of claim 5 wherein said alkali metals and said alkaline earth metals are selected from the group consisting of cobalt, copper, nickel, manganese, iron, vanadium, titanium, chromium and zinc.

9. The method of claim 5 wherein said hydrocarbon reducing agent is an olefin or paraffin having 1 to 5 carbon atoms.

10. The method of claim 5 wherein the concentration of nitrogen oxides in said exhaust gas is in the range from 50 to 50,000 ppm.

11. The method of claim 10 wherein the concentration of nitrogen oxides in said exhaust gas is in the range from 100 to 10,000 ppm.

12. The method of claim 5 wherein the concentration of oxygen in said exhaust gas is in the range from 0.1 to 15%.

13. The method of claim 5 wherein said combustion exhaust gases are from an automobile or a stationary source.

14. The method of claim 13 wherein said stationary is a plant turbine or boiler.

15. The method of claim 13 wherein said stationary source is an industrial source.

* * * * *